US007792490B2

(12) United States Patent
Annola et al.

(10) Patent No.: US 7,792,490 B2
(45) Date of Patent: Sep. 7, 2010

(54) HIDING A DEVICE

(75) Inventors: Johanna Annola, Tampere (FI); Sonja Karvinen, Tampere (FI); Jari Karlsberg, Tampere (FI); Rauno Mäkinen, Tampere (FI)

(73) Assignee: Nokia Corporation, Espoo (FI)

( * ) Notice: Subject to any disclaimer, the term of this patent is extended or adjusted under 35 U.S.C. 154(b) by 1558 days.

(21) Appl. No.: 10/138,773

(22) Filed: May 3, 2002

(65) Prior Publication Data

US 2002/0197956 A1    Dec. 26, 2002

(30) Foreign Application Priority Data

May 3, 2001    (FI)    .................................. 20010926

(51) Int. Cl.
*H04B 5/00*    (2006.01)
*H04B 7/00*    (2006.01)
*H04B 1/38*    (2006.01)

(52) U.S. Cl. .................... 455/41.2; 455/41.1; 455/41.3; 455/574; 455/565

(58) Field of Classification Search ................ 455/41.2, 455/41.3, 421, 574, 41.1, 565
See application file for complete search history.

(56) References Cited

U.S. PATENT DOCUMENTS

| | | | | |
|---|---|---|---|---|
| 6,571,103 | B1 * | 5/2003 | Novakov | 455/464 |
| 6,748,195 | B1 * | 6/2004 | Phillips | 455/41.2 |
| 6,754,469 | B1 * | 6/2004 | Lee et al. | 455/41.2 |
| 6,772,331 | B1 * | 8/2004 | Hind et al. | 713/151 |
| 6,834,192 | B1 * | 12/2004 | Watanabe et al. | 455/444 |
| 6,879,570 | B1 * | 4/2005 | Choi | 370/329 |
| 6,901,057 | B2 * | 5/2005 | Rune et al. | 370/310 |
| 6,950,645 | B1 * | 9/2005 | Kammer et al. | 455/343.1 |
| 7,020,467 | B2 * | 3/2006 | Tada | 455/434 |

(Continued)

FOREIGN PATENT DOCUMENTS

EP    1239630 A2    2/2002

(Continued)

OTHER PUBLICATIONS

User's Guide Bluetooth™ Headset HBH-10 and Phone Adapter DMA-10, Ericsson Mobile Communications AB, Sep. 2000.

(Continued)

*Primary Examiner*—Matthew D Anderson
*Assistant Examiner*—Wen W Huang
(74) *Attorney, Agent, or Firm*—Harrington & Smith (57) ABSTRACT

In accordance with the exemplary embodiments of the invention there is at least a method, apparatus, and an executable computer program enabling a first communications device and a second communications device, possibly previously unknown to each other, to communicate with each other wirelessly using short-range radio frequency technology. A connection establishment process is executed to establish a connection between the first communications device and said second communications device. Further, in accordance with the embodiments, during the connection establishment process, or in response to successful completion of the connection establishment process, at least one of said first and second communications devices switches from said first mode into a second mode, in which second mode, the communications device that has switched into said second mode does not respond to messages arriving at it which have been sent to discover the address of the communications device that has switched into said second mode.

51 Claims, 3 Drawing Sheets

U.S. PATENT DOCUMENTS

| | | | |
|---|---|---|---|
| 7,092,368 B2 * | 8/2006 | Kumar et al. | 370/328 |
| 7,155,163 B2 * | 12/2006 | Cannon et al. | 455/41.2 |
| 7,257,398 B1 * | 8/2007 | Ukita et al. | 455/420 |
| 2002/0123325 A1 * | 9/2002 | Cooper | 455/41 |
| 2002/0131445 A1 * | 9/2002 | Skubic et al. | 370/465 |
| 2003/0036350 A1 * | 2/2003 | Jonsson et al. | 455/41 |

FOREIGN PATENT DOCUMENTS

| | | |
|---|---|---|
| EP | 1255383 A2 * | 11/2002 |
| JP | 2002018082 | 1/2002 |
| WO | 00/72506 A1 | 11/2000 |
| WO | WO-00/76120 A2 | 12/2000 |
| WO | WO-02/28022 A2 | 4/2002 |

OTHER PUBLICATIONS

Translation of PCT Application No. PCT/FI01/00119 filed Feb. 8, 2001, Nokia Corporation et. al.

"Generic Access Profile", Specification of the Bluetooth System, Dec. 1, 1999, pp. 13-60, XP002241364.

"Bluetooth Architecture Overview" , Kardach, James, Bluetooth Architecture Overview, Mar. 18, 1999, pp. 1-45, XP002141146.

"Bluetooth—The Universal Radio Interface for Ad Hoc, Wireless Connectivity", Haartsen, J., 1998, pp. 110-117, XP000783249.

* cited by examiner

HIDING A DEVICE

FIELD OF THE INVENTION

The present invention relates to the use of short-range RF (Radio Frequency) technology. Particularly, but not necessarily, the invention relates to preventing the discoverability of a wireless communications device employing Bluetooth technology.

BACKGROUND OF THE INVENTION

Bluetooth technology is a new technology for wireless communications, enabling short-range wireless RF communications between mobile telephones, computers and PDA devices. Each Bluetooth device, i.e., any device supporting Bluetooth technology, will be equipped with a Bluetooth transceiver. This is a micro-chip, an integrated circuit, transmitting and receiving information such as voice or data wirelessly on the 2.4 GHz frequency band. At present, the maximum range of a Bluetooth connection using normal transmitter power is approximately 10 meters.

Ericsson has introduced their Ericsson Bluetooth Headset HBH-10 product. It is a headset comprising a microphone and speaker and using Bluetooth technology. The headset is intended to be used with a mobile telephone equipped with Bluetooth features. After initiating a call from the mobile phone, the user can listen to the other party via the headset speaker and talk to the headset microphone. Between the mobile phone and the headset, the call is transmitted over a Bluetooth connection.

Before using the headset for the first time, another device will be assigned as the communications partner. From the point of view of the mobile phone user, the headset HBH-10 and a Bluetooth-equipped mobile phone can be assigned as communications partners by the following procedure: First, the user selects the assignment function from the appropriate menu in the mobile phone. Then, the user enters the headset's passkey into the mobile phone and presses the activation key. The mobile phone will start a search for Bluetooth devices within its Bluetooth operating range. The mobile phone will detect the headset, as well as other devices that might be present within the Bluetooth operating range, and their identifiers will be shown on the mobile phone display. The user will select the identifier of the headset and press the activation key to assign the mobile phone and the headset as a pair of communications partners. The headset is now ready to be used with the mobile phone.

In the Bluetooth specification, this procedure of assigning the communications partners is called the pairing procedure. The purpose of the pairing procedure is to establish a permanent trusted relationship between two Bluetooth devices. This has the advantage, among others, that establishing a future connection between this pair of devices will be simpler than establishing a connection between a pair of devices previously unknown to each other.

In the following, the pairing procedure and connection establishment in general will be examined in relation to the Bluetooth specification in the case where the two devices are unknown to each other. The Bluetooth devices will be designated the first Bluetooth device and the second Bluetooth device. The first Bluetooth device is the one that initiates the pairing procedure. Before this, the first Bluetooth device must, however, determine the unique address (Bluetooth Device Address) of the second Bluetooth device.

To determine the address of the second Bluetooth device, the first Bluetooth device will send an inquiry message. The other Bluetooth device, as well as other Bluetooth devices that might be within the Bluetooth operating range, will receive the inquiry message and generate an inquiry_res message in response; this message includes the address of each responding Bluetooth device. The Bluetooth devices will send the inquiry_res messages to the first Bluetooth device which will receive them and thus get the addresses of the Bluetooth devices, including that of the second Bluetooth device (from the inquiry_res message received from the second Bluetooth device).

When the first Bluetooth device has gotten the address of the second Bluetooth device, it can start the pairing procedure with the second Bluetooth device. First, the first Bluetooth device will generate a random number. It will send the random number to the second Bluetooth device. The second Bluetooth device will receive the random number and send an acknowledgement to the first Bluetooth device which will then receive the acknowledgement. The pairing procedure will be continued as a multi-phased process designed to authenticate the first and the second Bluetooth device for establishing a trusted relationship between the two devices. During different phases of the pairing procedure, the random number mentioned above, the secret key of the second Bluetooth device and the address of the second Bluetooth device, among other things, will be needed. Finally, the pairing procedure will generate a link key that will be stored in both devices. The link key will be linked with the addresses of the first and second Bluetooth devices. This can be done, for example, by storing the link key adjacent to the second Bluetooth device address in the first Bluetooth device, and adjacent to the first Bluetooth device address in the second Bluetooth device. The link key can later be used, among other purposes, for authentication and for generating an encryption key when establishing a Bluetooth connection between the pair of devices. This is a typical mode of usage.

After generating the link key in the pairing procedure, a Bluetooth connection will be established between the first Bluetooth device and the second Bluetooth device. Bluetooth connection establishment can be started with the link establishment procedure. The link establishment procedure is a multi-phase procedure designed to establish a physical, Asynchronous Connection-Less (ACL) type link between Bluetooth devices. The link establishment procedure is started by sending a paging message from one Bluetooth device to the other. Typically, the first Bluetooth device initiates the establishment of the connection and thus becomes the master in a master-slave arrangement; the second Bluetooth device becomes the slave.

After an ACL link has been established, a SCO (Synchronous Connection-Oriented) link can be established between the Bluetooth devices using the SCO connection setup procedure.

The link establishment procedure is followed by the channel establishment procedure, where a Bluetooth channel (logical connection) will be established between the Bluetooth devices. The channel establishment procedure is followed by the connection establishment procedure, where the actual Bluetooth connection (application layer connection) will finally be established between the Bluetooth devices.

After the Bluetooth connection has been established, information such as voice or data can be transmitted over the Bluetooth connection from one Bluetooth device to the other.

Each Bluetooth device can establish a pair with several other Bluetooth devices. In some cases, however, it might be desirable that the Bluetooth device forms a pair and establishes a connection with only a few other Bluetooth devices or only a single device. The international patent application PCT/FI01/00119 describes a Bluetooth smart card reader which communicates information over a Bluetooth connection between a smart card inserted in the reader and a mobile phone external to the smart card reader. If said Bluetooth smart card reader is a device intended for personal use, and it is desirable for security reasons that the device only communicates with a single mobile phone, for example, it is unnecessary for such a Bluetooth smart card reader to announce its address to other Bluetooth devices besides the mobile phone.

There may also be other situations where it is desirable for security reasons that a personal Bluetooth device would not give its address to unknown Bluetooth devices in order to prevent attempts of unauthorized usage.

Also, if the user is listening to music using a Bluetooth headset, that is a headset equipped with a Bluetooth transceiver, and the music is transmitted, for example, from an MP3 player to the headset over a Bluetooth connection, the Bluetooth headset may receive an inquiry message querying the addresses of the headset and other Bluetooth devices inside the Bluetooth operating range. When the Bluetooth headset, which may have limited processing power, processes the inquiry message, this may interfere with the music playback in progress.

SUMMARY OF THE INVENTION

According to a first aspect of the invention there is provided a method where a first communications device and a second communications device, previously unknown to each other, communicate with each other wirelessly using short-range RF technology, the second communications device being, at a certain moment of time, in a first mode where the address of said second communications device is determinable by means of an inquiry wirelessly sent to it, and in which method:
 the first communications device sends a first message to determine the address of the second communications device;
 said second communications device receives the first message;
 said second communications device generates and sends to the first communications device a second message in response to the first message, said second message containing the address of said second communications device;
 a connection establishment process is carried out for establishing a connection between the first communications device and said second communications device.

The method is characterised in that in the method:
 during the connection establishment process, or in response to successful completion of said connection establishment process, at least one of said first and second communications devices switches from said first mode into a second mode, in which second mode the communications device that has switched into said second mode does not respond to messages arriving at it that have been sent in order to discover the address of the communications device that has switched into said second mode.

In an embodiment of the invention, the first device and the second device are devices equipped with a Bluetooth transceiver. Preferably, said second mode into which at least one of said devices switches is a Bluetooth non-discoverable mode in which the device will not respond to Bluetooth inquiry messages sent to query the address of the device. An advantage of the preferred embodiment is that after entering non-discoverable mode, unknown parties cannot determine the address of the device if disclosure is not desirable, as the device will not respond to inquiry messages. By entering non-discoverable mode, the device can also avoid unnecessary processing of inquiry messages and responding to them, which saves processing resources in the device.

According to a second aspect of the invention there is provided a first communications device comprising a transceiver for wireless communication with a second communications device using short-range RF technology, the first communications device comprising two different modes, in the first mode of which the address of the first communications device is determinable by means of a query wirelessly sent to it and in the second mode of which the address of the first communications device is not determinable by means of a query wirelessly sent to it, the first communications device comprising:
 said transceiver for receiving a first message sent by said second communications device, said first message having been sent in order to determine the address of said first communications device;
 a processing unit and said transceiver for generating and sending a second message to said second communications device in response to the first message, said second message containing the address of said first communications device;
 said processing unit and said transceiver for carrying out a connection establishment process with said second communications device to establish a connection between said first communications device and said second communications device.

The first communications device is characterised in that the first communications device is configured:
 to switch, during the connection establishment process or in response to successful completion of the connection establishment process, from said first mode to a second mode in which second mode it does not respond to messages arriving at it which have been sent to discover its address.

According to a third aspect of the invention there is provided a first communications device comprising a transceiver for wireless communication with a second communications device using short-range RF technology, the first communications device comprising two different modes, in the first mode of which the address of the first communications device is determinable by means of a query wirelessly sent to it and in the second mode of which the address of the first communications device is not determinable by means of a query wirelessly sent to it, the first communications device comprising:
 said transceiver for sending a first message to said second communications device in order to determine the address of said second communications device;
 said transceiver for receiving a second message sent by said second communications device to said first communications device in response to the first message, said second message containing the address of said second communications device;
 a processing unit and said transceiver for carrying out a connection establishment process with said second communications device to establish a connection between said first communications device and said second communications device.

The first communications device is characterised in that the first communications device is configured:
 to switch, during the connection establishment process or in response to successful completion of the connection establishment process, from said first mode to a second mode in which second mode it does not respond to messages arriving at it which have been sent to discover its address.

According to a fourth aspect of the invention there is provided a computer program product executable in a first communications device and comprising program code for:

causing the first communications device to communicate with a second communications device using wireless short-range RF technology;

implementing a particular first mode of the first communications device in which first mode the address of the first communications device is determinable by means of a query wirelessly sent to it;

causing the first communications device to receive a first message sent by said second communications device, said first message having been sent in order to determine the address of said first communications device;

causing the first communications device to generate and send to said second communications device a second message in response to the first message, said second message containing the address of said first communications device; and causing said first communications device to carry out a connection establishment process with said second communications device to establish a connection between said first communications device and said second communications device.

It is characteristic of the computer program product that the computer program product comprises program code for:

causing the first communications device to switch, during the connection establishment process or in response to successful completion of the connection establishment process, from said first mode to a second mode in which second mode it does not respond to messages arriving at it which have been sent to discover its address.

According to a fifth aspect of the invention there is provided a computer program product executable in a first communications device and comprising program code for:

causing the first communications device to communicate with a second communications device using wireless short-range RF technology;

implementing a particular first mode of the first communications device in which first mode the address of the first communications device is determinable by means of a query wirelessly sent to it;

causing the first communications device to send a first message to said second communications device in order to determine the address of said second communications device;

causing the first communications device to receive a second message sent by said second communications device to said first communications device in response to the first message, said second message containing the address of said second communications device; and causing said first communications device to carry out a connection establishment process with said second communications device to establish a connection between said first communications device and said second communications device.

It is characteristic of the computer program product that the computer program product comprises program code for:

causing the first communications device to switch, during the connection establishment process or in response to successful completion of the connection establishment process, from said first mode to a second mode in which second mode it does not respond to messages arriving at it which have been sent to discover its address.

BRIEF DESCRIPTION OF THE DRAWINGS

In the following, the invention will be discussed in more detail by referring to the enclosed drawings, in which.

DETAILED DESCRIPTION

Figure 1:
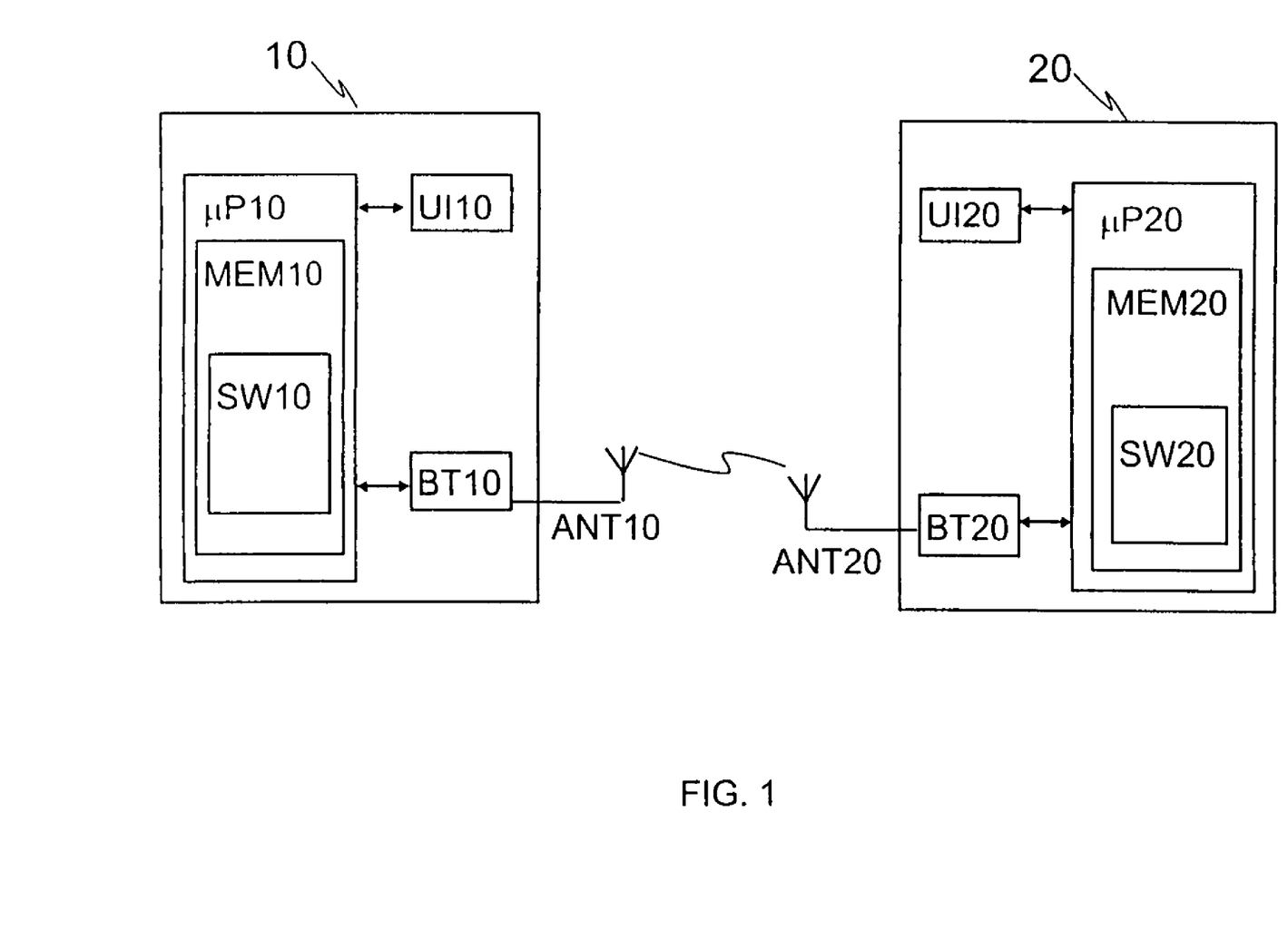
FIG. 1 illustrates devices used in an embodiment of the invention.

FIG. 1 illustrates devices used in a preferred embodiment of the invention. These include a first wireless communications device 10 and a second wireless communications device 20.

The first wireless communications device 10 comprises a processing unit µP10, a Bluetooth transceiver BT10 and a user interface UI10. The Bluetooth transceiver BT10 and the user interface UI10 are connected to the processing unit µP10. The processing unit µP10 comprises a microprocessor, microcontroller, digital signal processor or similar processing device, a memory MEM10 and software (one or more applications) SW10. The software SW10 is stored in the memory MEM10. The user interface UI10 provides the user with means for using the first wireless communications device 10. The processing unit µP10 controls the functions of the first wireless communications device 10, such as the use of the Bluetooth transceiver BT10, the presentation of information in the user interface UI10 and the processing of information received from the user interface UI10, in accordance with software SW10. The Bluetooth transceiver BT10 comprises an antenna ANT10 through which the Bluetooth transceiver BT10 is able to wirelessly transmit information to the second wireless communications device 20 and receive information from the second wireless communications device 20.

The second wireless communications device 20 comprises a processing unit µP20, a Bluetooth transceiver BT20 and a user interface UI20. The Bluetooth transceiver BT20 and the user interface UI20 are connected to the processing unit µP20. The processing unit µP20 comprises a microprocessor, microcontroller, digital signal processor or similar processing device, a memory MEM20 and software (one or more applications) SW20. The software SW20 is stored in the memory MEM20. The user interface UI20 provides the user with means for using the second wireless communications device 20. The processing unit µP20 controls the functions of the second wireless communications device 20, such as the use of the Bluetooth transceiver BT20, the presentation of information in the user interface UI20 and the processing of information received from the user interface UI20, in accordance with software SW20. The Bluetooth transceiver BT20 comprises an antenna ANT20 through which the Bluetooth transceiver BT20 is able to wirelessly transmit information to the first wireless communications device 10 and receive information from the first wireless communications device 10.

The first and second wireless communications devices can be any kind of Bluetooth devices. For example, the first wireless communication device 10 can be a cellular mobile telephone equipped with a Bluetooth transceiver, and the second wireless communications device 20 can be a Bluetooth smart card reader. If the first wireless communications device 10 is a cellular mobile telephone, in addition to the blocks shown in FIG. 1, it comprises a RF section connected to the processing unit μP10 for implementing the cellular network functions. Furthermore, the user interface UI10 of the first wireless communications device 10 comprises, for example, a display, a keyboard, a microphone and a speaker. If the second wireless communications device 20 is a Bluetooth smart card reader, in addition to the blocks shown in FIG. 1, it comprises a card slot connected to the processing unit μP20 for receiving a smart card into the Bluetooth smart card reader.

Or, the first wireless communication device 10 can be a cellular mobile telephone equipped with a Bluetooth transceiver, and the second wireless communications device 20 can be a Bluetooth headset. In this case, the user interface UI20 of the second wireless communications device (FIG. 1) comprises one or more speakers and possibly a microphone connected to the processing unit μP20.

Figure 2:
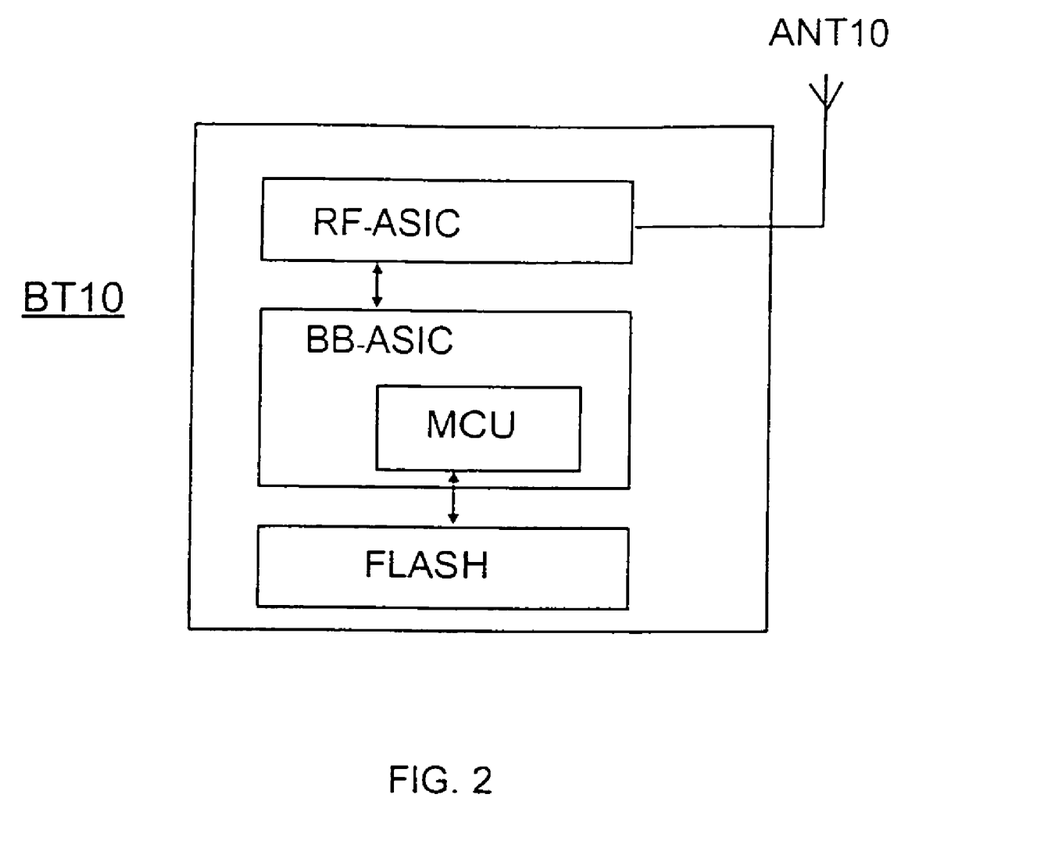
FIG. 2 is a block diagram of a Bluetooth transceiver.

FIG. 2 is a block diagram showing the blocks of the as such well known Bluetooth transceiver BT10. (The Bluetooth transceiver BT20 can be shown in the form of a similar block diagram.) The Bluetooth transceiver BT10 is implemented in a so-called Bluetooth module or Bluetooth chip which is a programmable integrated circuit unit comprising an RF-ASIC circuit (Radio Frequency Application Specific Integrated Circuit) and an antenna ANT10, a BB-ASIC circuit (BaseBand-Application Specific Integrated Circuit) and an electrically erasable FLASH memory.

The RF-ASIC is a radio frequency integrated circuit. It is connected to the antenna ANT10. Using the antenna ANT10, the RF-ASIC implements a RF transceiver operating in the 2.4 GHz band.

The RF-ASIC and the FLASH memory are connected to the BB-ASIC. The BB-ASIC is a baseband integrated circuit that carries out the processing of baseband signals. The BB-ASIC implements a processing unit MCU that controls, with the aid of the FLASH memory, the overall functions of the Bluetooth transceiver BT10. The FLASH memory contains the software for the Bluetooth transceiver, comprising the Bluetooth protocols among other things. (Typically, the software comprises program code written in an appropriate programming language.) The BB-ASIC is connected to the processing unit μP10 via an appropriate bus (not shown), for example.

In a preferred embodiment of the invention, the pairing procedure is used to establish a trusted relationship between the first and second wireless communications devices 10, 20 previously unknown to each other. After this, a Bluetooth connection will be established between the devices for communicating information such as voice or data from one wireless communications device to another. The fact that the first and second wireless communications device are unknown to each other means that in the beginning, they have no knowledge of the other device's address.

In a preferred embodiment of the invention, of the wireless communications devices 10, 20, the first wireless communications device (10) is the one taking the initiative. First, it must determine the unique address (Bluetooth Device Address) of the second wireless communications device 20 to be able to start the pairing procedure with the second wireless communications device 20. The processing unit MCU of the Bluetooth transceiver in the first wireless communications device generates an inquiry message according to the Bluetooth protocol. The processing unit transfers the inquiry message to the RF-ASIC of the Bluetooth transceiver; after the necessary modulation operations, it will transmit the inquiry message through its antenna ANT10. If it is desirable that the inquiry message only reaches the second wireless communications device 20 and no other devices, it can be arranged that there are no other devices but the second wireless communications device 20 inside the Bluetooth range.

The Bluetooth transceiver BT20 in the second wireless communications device receives the inquiry message through its antenna ANT20; after the necessary demodulation operations, it will be transferred through the RF-ASIC to the processing unit MCU in the BB-ASIC. The processing unit generates an inquiry_res message in response to the inquiry message; the response contains the address of the second wireless communications device, specifically the Bluetooth Device Address of the Bluetooth transceiver BT20. The processing unit MCU transfers the inquiry_res message to the RF-ASIC of the Bluetooth transceiver; after the necessary modulation operations, it will transmit the inquiry_res message through its antenna ANT20 to the first wireless communications device 10.

The Bluetooth transceiver BT10 in the first wireless communications device receives the inquiry_res message through its antenna ANT20; after the necessary demodulation operations, it will be transferred through the RF-ASIC to the processing unit MCU in the BB-ASIC, which will this way receive the address of the second wireless communications device 20.

When the first wireless communications device 10 has gotten the address of the second wireless communications device 20, it can start the pairing procedure with the second wireless communications device 20. In accordance with the master-slave principle, the first wireless communications device 10 is the master in the pairing procedure (as it initiates the procedure), and the second wireless communications device 20 is the slave.

First, the processing unit MCU in the Bluetooth transceiver of the first wireless communications device 10 generates a random number. It transmits the random number to the second wireless communications device 20 through the Bluetooth transceiver BT10. The second wireless communications device 20 will receive the random number through the Bluetooth transceiver BT20 and send an acknowledgement to the first wireless communications device which will then receive the acknowledgement. The pairing procedure will now continue as a multiphase process, where the random number and the passkey of the second wireless communications device 20 will be needed, among other data. The passkey of the second wireless communications device can be queried from the user, for example.

If the pairing procedure is successful, the first wireless communications device 10 and the second wireless communications device 20 will finally establish a link key that will be used as the foundation for all securing actions (such as authentication and encryption key generation) for all upcoming Bluetooth connections established between the first wireless communications device 10 and the second wireless communications device 20.

The processing unit MCU in the Bluetooth transceiver BT10 of the first wireless communications device will store the link key in its FLASH memory, and the processing unit MCU in the Bluetooth transceiver BT20 of the second wireless communications device will store the link key in its FLASH memory. The link key will be linked with the addresses of the first and second wireless communications devices. This can be done, for example, by storing the link key adjacent to the address of the second wireless communications device 20 in the first wireless communications device 10, and adjacent to the address of the first wireless communications device 10 in the second wireless communications device 20. If the address of the second wireless communications device 20 was not stored into the first wireless communications device 10 before storing the link key, the address can be stored together with the link key. Correspondingly, if the address of the first wireless communications device 10 was not stored into the second wireless communications device 20 before storing the link key, the address can be stored together with the link key. The second wireless communications device 20 gets the address of the first wireless communications device 10 from the address field of the inquiry message, for example, or from the address field of any message sent by the first wireless communications device 10 to the second wireless communications device 20 during the pairing procedure.

The storing of link keys also means that the second wireless communications device 20 will be marked as a trusted device in the first wireless communications device 10, and the first wireless communications device 10 will be marked as a trusted device in the second wireless communications device 20. This way, a trusted relationship has been established between the first wireless communications device 10 and the second wireless communications device 20; the relationship is indicated by storing connection information into both devices. In this context, connection information refers to the link key generated in the pairing procedure and the addresses of the wireless communications devices 10, 20. Because the connection information is stored in the pairing procedure, establishing a future connection between this pair of wireless communications devices will be simpler than establishing a connection between a pair of devices previously unknown to each other. The pairing procedure will thus increase the user comfort of a Bluetooth-equipped device. It must be noted, though, that a Bluetooth connection between devices can also be established without the pairing procedure.

In the following, the connection establishment process between the first and second wireless communications devices will be described in a case where the wireless communications devices 10, 20 have been formed into a pair using the pairing procedure. After a successful pairing procedure, the establishment of a Bluetooth connection between the wireless communications devices 10, 20 can be started, for example, using the link establishment procedure. Because the Bluetooth connection is established with a device marked as trusted in the pairing procedure, the Bluetooth connection to be established is usually called a trusted Bluetooth connection. In a preferred embodiment of the invention, the first wireless communications device 10 initiates a connection with the link establishment procedure by sending a paging message to the second wireless communications device at the address of the second wireless communications device 20; in accordance with the master-slave principle, the first device will become the master, and the second device will become the slave.

After an ACL link has been established using the link establishment procedure, a SCO (Synchronous Connection-Oriented) link can be established between the first and second wireless communications devices 10, 20 by initiating the SCO connection setup procedure from the first wireless communications device 10.

When the link establishment procedure is completed, the first wireless communications device 10 will start the channel establishment procedure, where a Bluetooth channel (logical connection) will be established between the wireless communications devices. After the channel establishment procedure, the first wireless communications device 10 will initiate the connection establishment procedure, where the actual Bluetooth connection (application layer connection) will finally be established between the first and second wireless communications devices 10, 20.

After the Bluetooth connection has been established between the first and second wireless communications devices, information such as voice or data can be transmitted over the Bluetooth connection from one wireless communications device to the other. This type of Bluetooth connection, established between devices marked trusted by each other in the pairing procedure, is called a trusted Bluetooth connection.

In a preferred embodiment of the invention, the second wireless communications device 20 will, in response to the connection establishment process, enter a mode where it is hidden from other Bluetooth devices. Such a mode is defined in the Bluetooth specification and called the non-discoverable mode. Here, "in response to the connection establishment process" means that the second wireless communications device 20 will enter non-discoverable mode at a suitable moment during the connection establishment process or immediately thereafter. In practice, such a suitable moment may be, for example, when the second wireless communications device 20 sends the first wireless communications device a connect_est_acc message indicating to the first wireless communications device 10 that the Bluetooth connection has been established. Because the connect_est_acc message ends the connection establishment procedure, it can be stated that in this case, the second wireless communications device 20 enters non-discoverable mode in response to a successful connection establishment process.

While in non-discoverable mode, the Bluetooth device will not enter inquiry response mode. In other words, it will not respond to inquiry messages. After entering non-discoverable mode, unknown parties will be unable to determine the address of the second wireless communications device 20, because the second wireless communications device 20 will not respond to inquiry messages. The second wireless communications device 20 can also avoid unnecessary processing of inquiry messages and responding to them, which saves processing resources in the second wireless communications device 20. On the other hand, as no response will be sent to the inquiry message, the first wireless communications device 10 that sent the inquiry message will not get unnecessary address information from a wireless communications device 20 which it does not intend to communicate with. Security will also be improved, as the address of the second wireless communications device 20 will not be available to all other Bluetooth devices sending inquiry messages. Security will also be improved because as the second wireless communications device 20 will not respond to inquiry messages after entering non-discoverable mode, it will not reveal its location to unknown Bluetooth devices sending inquiry messages nor to their users.

To establish a Bluetooth connection, only the address of the Bluetooth device with which the connection is desired needs to be known. After the second wireless communications device 20 has entered non-discoverable mode, a Bluetooth connection between a third Bluetooth device and the second wireless communications device 20 that is in non-discoverable mode can be established in a totally normal way if the third Bluetooth device knows the address of the second wireless communications device 20. To establish a Bluetooth connection, the third Bluetooth device can, for example, initiate the link_establishment procedure by first sending the second wireless communications device 20 a paging message. As the second wireless communications device 20 is in non-discoverable mode, though, it will not report its address to Bluetooth devices that do not already know it. This way, unnecessary connection requests from unknown Bluetooth devices to the second wireless communications device can be avoided.

As mentioned previously, a Bluetooth connection can also be established without the pairing procedure. (In this case, the Bluetooth connection is not called a trusted Bluetooth connection, because the connection is not established with a device marked as trusted.) In an alternative embodiment of the invention, the first wireless communications device 10, after getting the address of the second wireless communications device 20 by means of the inquiry procedure, will start the connection establishment process without a pairing procedure. Also in this case, the connection establishment process comprises the link establishment, channel establishment and connection establishment procedures, and it is initiated with a paging message sent by the first wireless communications device 10 to the second wireless communications device 20 at the address of the second wireless communications device 20. Here, a link key will also be created for use when establishing the connection. However, this embodiment differs from the preferred embodiment where the connection between the wireless communications devices was established through the pairing procedure in that the link key will not be permanently stored into the wireless communications devices 10, 20. That is, the same link key can not be used for new connections between the wireless communications devices 10 and 20, but a new link key must be generated when establishing a new connection. For example, if the first wireless communications device 10 is a cellular mobile terminal and the second wireless communications device 20 is a beverage vending machine (Point-of-Sale terminal) equipped with a Bluetooth transceiver, enabling the wireless purchase of beverages using devices such as the first wireless communications device that can exist in millions, it would not always be reasonable to store all the link keys into the limited memory of the vending machine. In this embodiment, the second wireless communications device 20 will enter non-discoverable mode in response to connection establishment, just as in the preferred embodiment of the invention. Nevertheless, if the vending machine is able to serve more than one wireless communications device at a time, it would not always be reasonable for the machine to enter non-discoverable mode in response to the first connection establishment. Alternatively, it will enter non-discoverable mode only when its service capacity is full. This means that if the vending machine is able to serve, for example, eight Bluetooth devices simultaneously, it would enter non-discoverable mode (typically temporarily rather than permanently) in response to the connection establishment process where the eighth simultaneous Bluetooth connection is established. The device will enter non-discoverable mode automatically (with no user intervention).

Correspondingly, if the second wireless communications device 20 is a WLAN (Wireless Local Area Network) access point supporting, for example, five simultaneous Bluetooth connection, it would enter non-discoverable mode in response to the connection establishment process where the fifth simultaneous Bluetooth connection is established to the access point.

If the second wireless communications device 20 is a beverage vending machine or a WLAN access point, the term "wireless" refers primarily to wireless communication of information.

The period that the wireless communications device 20 will stay in non-discoverable mode is dependent on the case. If the first wireless communications device 10 is a cellular mobile terminal and the second wireless communications device 20 is a personal device (such as a personal Bluetooth smart card reader) intended to communicate with a single user's mobile terminal only, it is appropriate for the wireless communications device to permanently stay in non-discoverable mode. In other words, it will not return to discovery mode without special operations. Such a special operation could be resetting the device, which would restore the second wireless communications device 20 to its original factory settings. Now, the second wireless communications device 20 will enter non-discoverable mode again in response to the first connection establishment process after reset.

In some cases, it may be appropriate that the second wireless communications device 20 return from non-discoverable mode to discovery mode in response to a Bluetooth disconnection. In the beverage vending machine example above, the vending machine can return to discovery mode when at least one Bluetooth connection through which beverages are being purchased is disconnected. In this case, the vending machine would thus return to discovery mode immediately after its service capacity has been freed by means of disconnecting a Bluetooth connection.

In an alternative embodiment of the invention, the second wireless communications device will enter non-discoverable mode in response to the first connection establishment, but will always return to discovery mode for a definite period (such as 30 seconds, 1 minute or 2 minutes) in response to a certain operation that could be, for example, the restarting of the second wireless communications device 20. After said definite period has elapsed, the second wireless communications device 20 will automatically return to non-discoverable mode without user intervention. This embodiment is well suited for a situation where it is desirable that the second wireless communications device 20 stays in non-discoverable mode for almost all the time, but where there is a need to establish the second wireless communications device 20 as a pair with other Bluetooth devices besides the first wireless communications device 10. If, for example, the second wireless communications device 20 is a Bluetooth headset and the first wireless communications device 10 is a cellular mobile telephone, the Bluetooth headset will enter non-discoverable mode in response to the first connection establishment process initiated by the wireless communications device 10. If the user desires to use the Bluetooth headset to listen to a stereo radio equipped with a Bluetooth transceiver, for example, the headset can be turned off and restarted. Now, the headset will be in discovery mode for a definite period during which it is possible to carry out an inquiry procedure between the stereo radio and the headset, and possibly start the necessary procedures to form a pair and/or establish a Bluetooth connection between the stereo radio and the Bluetooth headset.

In some cases, two Bluetooth devices can carry out a pairing procedure a long time (such as several hours or days) before establishing the first Bluetooth connection between the devices. Let us assume that a certain first Bluetooth device starts a pairing procedure where the other party is a certain second Bluetooth device. According to an embodiment of the invention, said second Bluetooth device will enter non-discoverable mode already in response to the pairing procedure and not in response to the connection establishment process (as described in the preferred embodiment of the invention). Especially if said second Bluetooth device (for example, a Bluetooth smart card reader) is specifically intended to communicate with a single user's mobile communications terminal, in many cases it would not be appropriate that the other Bluetooth device would respond to inquiry messages between completing the pairing procedure and initiating the connection establishment process.

If the second Bluetooth device enters non-discoverable mode in response to the pairing procedure, this means that it will enter non-discoverable mode at a suitable moment during the pairing procedure or immediately thereafter. In practice, such a suitable moment can be for example when the link key is stored in the Bluetooth device. Because the storage of the link key ends the successfully completed pairing procedure, it can be stated that in this case, the second Bluetooth device enters non-discoverable mode in response to a successful pairing procedure (or in response to the storage of the link key).

Figure 3:
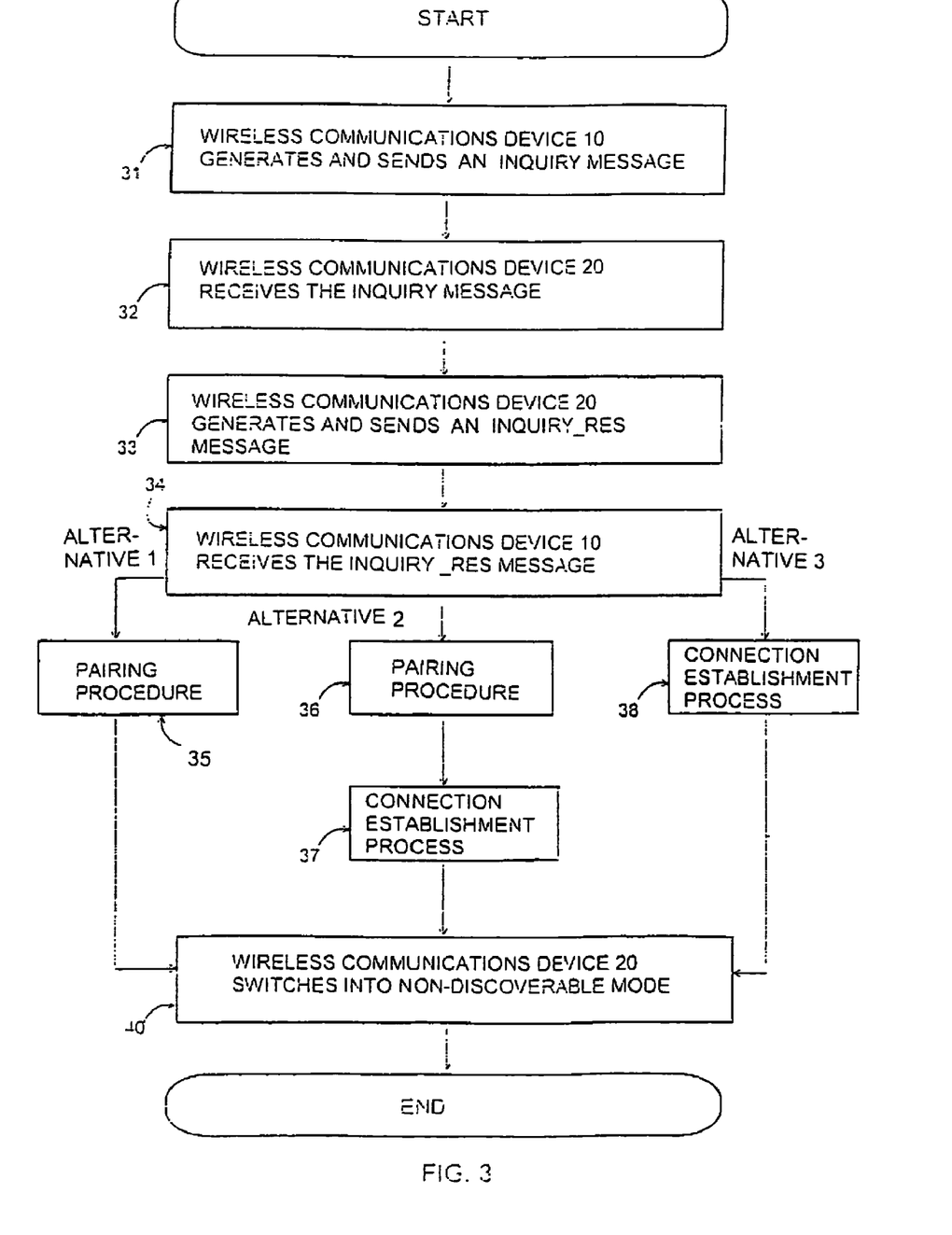
FIG. 3 is a flow chart illustrating the various alternative embodiments of a system according to the invention.

FIG. 3 is a flow chart that illustrates the functionality according to the invention and its three alternatives. In block 31, the first wireless communications device 10 sends an inquiry message to get the address of the second wireless communications device 20. In block 32, the second wireless communications device 20 receives the inquiry message. In block 33, the second wireless communications device generates an inquiry_res message in response to the inquiry message, including the address of the second wireless communications device 20, and sends the inquiry_res message to the first wireless communications device 10. In block 34, the first wireless communications device 10 receives the inquiry_res message and thus gets the address of the second wireless communications device 20 for the pairing procedure and/or the connection establishment process. In alternative 1, block 34 is followed by block 35 where the pairing procedure is carried out by initiative of the first wireless communications device 10. Block 35 is followed by block 40 where the second wireless communications device 20 enters non-discoverable mode in response to the pairing procedure. In alternative 2, block 34 is followed by block 36 where, likewise, the pairing procedure is carried out by initiative of the first wireless communications device 10. Block 36 is followed by block 37 where the connection establishment process is carried out by initiative of the first wireless communications device 10. Block 37 is followed by block 40 where the second wireless communications device 20 enters non-discoverable mode in response to the connection establishment process. In alternative 3, block 34 is followed by block 38 where the connection establishment process without any pairing procedure is carried out by initiative of the first wireless communications device 10. Block 38 is followed by block 40 where the second wireless communications device 20 enters non-discoverable mode in response to the connection establishment process.

In this description, the pairing procedure and the connection establishment process have been treated as separate processes. However, it is also possible that the pairing procedure is rigidly connected with the connection establishment process. This means that the pairing procedure can be an inseparable part of the connection establishment process. If this is the case, it can be stated that the Bluetooth device receiving the connection enters non-discovery mode in response to the connection establishment process regardless of whether the Bluetooth device actually enters non-discovery mode in response to the pairing procedure or at a later stage of the connection establishment process.

On the other hand, even if there was a break between the pairing procedure and the connection establishment process, so that the pairing procedure could not be considered an inseparable part of the connection establishment process, using a wide interpretation of the connection establishment process it could still be stated that the pairing procedure is a part of the connection establishment process. Here, the connection establishment process is defined as an entity that can cover both the pairing procedure and the actual connection establishment procedures. The execution of actual connection establishment procedures is also dependent on whether the pairing procedure has been executed or not. So, even if the Bluetooth device would enter non-discoverable mode in practice in response to the pairing procedure, it is correct to say that it enters non-discoverable mode in response to the connection establishment process, because the pairing process can be considered part of the connection establishment process.

Even though it has been described here that only the wireless communications device receiving the connection would enter non-discoverable mode, according to an alternative embodiment of the invention it is possible that the wireless communications device initiating the connection enters non-discoverable mode. In an embodiment of the invention, a certain first wireless communications device starts by querying the address of a certain second wireless communications device using an inquiry procedure. The first wireless communications device will now start a pairing procedure targeted at the second wireless communications device. Nevertheless, the actual connection establishment procedures are started by said second wireless communications device by sending a paging message to the first wireless communications device (to the address of the first wireless communications device). Said second wireless communications device will enter non-discoverable mode in response to the connection establishment process, but the first wireless communications device will stay in discovery mode. In this embodiment, the first wireless communications device can be, for example, a cellular mobile terminal, and the second wireless communications device can be a Bluetooth smart card reader. After a successfully completed pairing procedure initiated by the cellular mobile terminal, the Bluetooth smart card reader can initiate a connection to the mobile terminal automatically in response to smart card insertion, for example, and then enter non-discoverable mode. (The Bluetooth smart card reader contains a sensor connected to the processing unit that will detect the insertion of a smart card into the Bluetooth smart card reader.)

The invention can be implemented in software, in which case the non-discoverable mode control software is a part of the Bluetooth transceiver software stored in the FLASH memory (FIG. 2). The transition to non-discoverable mode will be controlled by the processing unit MCU in the Bluetooth transceiver using the non-discoverable mode control software.

This description presents the implementation and embodiments of the present invention with the help of examples. It is obvious to a person skilled in the art that the present invention is not restricted to details of the embodiments presented above, and that the invention can also be implemented in another form without deviating from the characteristics of the invention. The invention must not be limited to the messages and procedures expressly named in the description, for example. With the appropriate changes, the pairing procedure, for example, can be replaced with the bonding procedure known in Bluetooth technology. The invention must not be limited to Bluetooth technology, either, because the invention can also be applied to other similar systems where information is communicated over a short-range RF connection. The invention must not be limited to the structure of the first and second wireless communications devices presented here as examples. For example, a wireless communications device does not necessarily contain another processing unit besides the one in the Bluetooth transceiver, but even the processing unit of the wireless communications device may be integrated into the processing unit of the Bluetooth transceiver.

The embodiments presented should thus be considered illustrative, but not restricting. Thus, the possibilities of implementing and using the invention are only restricted by the enclosed claims. The various options of implementing the invention as determined by the claims, including the equivalent implementations, also belong to the scope of the invention.

The invention claimed is:

1. A method comprising:
communicating wirelessly one or more messages between a first communications device and a second communications device to initiate a wireless connection between the first and said second communications device;
carrying out a connection establishment process to establish the wireless connection between the first and said second communications device; and
based upon a successful completion of said wireless connection establishment process between the first and said second communications device, switching an operational mode of at least one of the first and said second communications device from a first operational mode into a second operational mode, where in the second operational mode information is communicated between the first and said second communications device over the established wireless connection, and where in the second operational mode the at least one of the first and said second communications device does not respond to any arriving messages to discover an address of the at least one of the first and said second communications device in order to establish a further connection after switching into said second operational mode.

2. The method according to claim 1, wherein the connection establishment process is initiated by the first communications device based on an address of said second communications device.

3. The method according to claim 1, wherein said second communications device switches into said second operational mode.

4. The method according to claim 1, wherein the at least one of the first and said second communications devices switches into said second operational mode in response to a pairing that is part of the wireless connection establishment process.

5. The method according to claim 1, wherein the at least one of the first and said second communications devices automatically switches into said second operational mode dependent upon a service capacity of the device.

6. The method according to claim 1, further comprising the at least one of the first and said second communications device that has switched into said second operational mode returning from said second operational mode to said first operational mode in response to at least one of a reset of one of the first and said second communication device, and an expiry of a definite time period.

7. The method according to claim 1, further comprising the at least one of the first and said second communications device that has switched into said second operational mode returns from said second operational mode to said first operational mode in response to a reset of said communications device.

8. The method according to claim 1, further comprising the at least one of the first and said second communications device that has switched into said second operational mode returning to said first operational mode for a definite period and after said definite period has expired said communications device returning to said second operational mode.

9. The method according to claim 8, wherein the at least one of the first and said second communications device that has switched into said second operational mode returns to said first operational mode for the definite period in response to a restart of said communications device.

10. The method according to claim 1, wherein a short-range radio frequency connection is established between the first and said second communications device in response to the connection establishment process.

11. The method of claim 10, wherein the at least one communications device that has switched into said second operational mode returns from said second operational mode to said first operational mode in response to a disconnection of said short-range radio frequency connection.

12. The method according to claim 1, wherein the first communications device and said second communications device communicate using Bluetooth technology and, wherein the communicating comprises an inquiry message according to the Bluetooth technology and an inquiry response message according to the Bluetooth technology, and wherein said first operational mode is a discoverable mode according to the Bluetooth technology and said second operational mode is a non-discoverable mode according to the Bluetooth technology.

13. The method according to claim 1, wherein said first communications device is a cellular mobile terminal and said second communications device is a Bluetooth headset.

14. The method of claim 1, further comprising maintaining the second operational mode until detecting the established wireless connection is disconnected.

15. An apparatus comprising:
at least one processor; and
at least one memory including computer program code, where the at least one memory and the computer program code are configured, with the at least one processor, to cause the apparatus to at least:
communicate wirelessly one or more messages between the apparatus and another communications device to initiate a wireless connection between the apparatus and said another communications device;
carry out a connection establishment process to establish the wireless connection between said apparatus and said another communications device; and
based upon a successful completion of the wireless connection establishment process between said apparatus and said another communications device, switch an operational mode of said apparatus from a first operational mode into a second operational mode, where in the second operational mode information is communicated between said apparatus and said another communications device over the established wireless connection, and where in the second operational mode said apparatus does not respond to any arriving messages to discover an address of said apparatus in order to establish a further wireless connection after switching into said second operational mode.

16. The apparatus according to claim 15, wherein the wireless connection is initiated by said apparatus based on an address of said another communications device.

17. The apparatus of claim 15, further comprising maintaining the second operational mode until detecting the established wireless connection is disconnected.

18. The apparatus of claim 15, wherein the apparatus returns from the second operational mode to the first operational mode for a definite period following an event.

19. The apparatus of claim 18, wherein the event includes a restarting of the apparatus.

20. The apparatus of claim 15, wherein the connection establishment process is initiated by the apparatus.

21. The apparatus of claim 15, wherein said apparatus is configured to switch into said second operational mode in response to a pairing that is part of the connection establishment process.

22. The apparatus of claim 15, wherein the apparatus is configured to return from said second operational mode to said first operational mode in response to at least one of a reset of said apparatus, a reset of said another communications device, an expiry of a definite time period, and a disconnection of a short-range radio frequency connection.

23. The apparatus of claim 15, wherein said apparatus is configured to communicate with said another communications device using short-range radio frequency technology in response to the connection establishment process.

24. The apparatus of claim 15, wherein said communication between the apparatus and the another communications device comprises an inquiry message according to Bluetooth technology and an inquiry response message according to the Bluetooth technology, and wherein said first operational mode is a discoverable mode according to the Bluetooth technology and said second operational mode is a non-discoverable mode according to the Bluetooth technology.

25. The apparatus of claim 15, wherein said apparatus is one of a Bluetooth headset, a cellular mobile station, and a Bluetooth chip.

26. The apparatus of claim 15, wherein the wireless connection is initiated by said another communications device based on an address of said apparatus.

27. A system, comprising:
a first apparatus configured to send an inquiry message to a second apparatus in order to determine an address of said-second apparatus; and
said first apparatus configured to receive inquiry response message sent by said second apparatus to said first apparatus in response to the sent inquiry message, where said inquiry response message contains the address of said second apparatus;
said first apparatus configured to carry out a connection establishment process with said second apparatus to establish a wireless connection between said first and said second apparatus; and
based upon a successful completion of the wireless connection establishment process between said first and said second apparatus, at least one of said first and said second apparatus is configured to switch an operational mode from a first operational mode to a second operational mode, where in the second operational mode information is communicated between said first and said second apparatus over the established wireless connection, and where in the second operational mode the at least one of said first and said second apparatus does not respond to any arriving messages to discover an address of the at least one of said first and said second apparatus in order to establish a further wireless connection after switching into said second operational mode.

28. The system of claim 27, wherein receiving a paging message sent by the second apparatus initiates the connection establishment process.

29. The system of claim 27, wherein said at least one of the first and the second apparatus is configured to switch into said second operational mode in response to a pairing that is part of the connection establishment process.

30. The system of claim 27, wherein the at least one of the first and the second apparatus is configured to return from said second operational mode to said first operational mode in response to at least one of a reset of an apparatus, an expiry of a definite time period, and a disconnection of a short-range radio frequency connection.

31. The system of claim 27, wherein said first apparatus is configured to communicate with said second apparatus using short-range radio frequency technology.

32. The system of claim 27, wherein said communication between the first apparatus and the second apparatus comprises an inquiry message according to Bluetooth technology and an inquiry response message according to the Bluetooth technology, and wherein said first operational mode is a discoverable mode according to the Bluetooth technology and said second operational mode is a non-discoverable mode according to the Bluetooth technology.

33. The system of claim 27, wherein at least one of said first apparatus and the second apparatus is one of a Bluetooth headset, a cellular mobile station, and a Bluetooth chip.

34. A memory embodying a computer program, the computer program executable by a processor to perform operations comprising:
communicating wirelessly one or more messages between an apparatus and another communications device to initiate a wireless connection between the apparatus and the another communications device;
carrying out a connection establishment process to establish the wireless connection between the apparatus and the another communications device; and
based upon a successful completion of the wireless connection establishment process between the apparatus and the another communications device, switching an operational mode of the apparatus from a first operational mode to a second operational mode, where in the second operational mode information is communicated between the apparatus and the another communications device over the established wireless connection, and where in the second operational mode the apparatus does not respond to any arriving messages to discover an address of the apparatus in order to establish a further wireless connection after switching into said second operational mode.

35. The memory of claim 34, wherein the apparatus is one of a Bluetooth headset, a cellular mobile station, and a Bluetooth chip.

36. The memory of claim 34, further comprising maintaining the second operational mode until detecting the established wireless connection is disconnected.

37. The memory of claim 34, wherein said apparatus is one of a Bluetooth headset, a cellular mobile station, and a Bluetooth chip.

38. A memory embodying a computer program, the computer program executable by a processor to perform operations comprising:
sending, by an apparatus, an inquiry message to another communications device in order to determine an address of said another communications device;
receiving, at the apparatus an inquiry response message from said another communications device, where said inquiry response message contains the address of said another communications device; and
carrying out, by said apparatus, a connection establishment process with said another communications device to establish a wireless connection between said apparatus and said another communications device, and
based upon a successful completion of the wireless connection establishment process with said another communications device, switching an operational mode of the apparatus from a first operational mode to a second operational mode, where in the second operational mode information is communicated between said apparatus and said another communications device over the established wireless connection, and where in the second operational mode the apparatus does not respond to any arriving messages to discover an address of the apparatus in order to establish a further wireless connection, and where said second operational mode is a non-discoverable mode.

39. The memory of claim 38, wherein the apparatus is one of a Bluetooth headset, a cellular mobile station, and a Bluetooth chip.

40. An apparatus, comprising:
at least one processor; and
at least one memory including computer program code, where the at least one memory and the computer program code are configured, with the at least one processor, to cause the apparatus to at least:
send an inquiry message from the apparatus to another communications device to determine an address of the another communications device;
receive at the apparatus an inquiry response message from the another communications device, where said inquiry response message includes the address of said another communications device;
carry out a connection establishment process for establishing a wireless connection with said another communications device; and
based upon a successful completion of said wireless connection establishment process with said another communications device, switch an operational mode of said apparatus from a first operational mode to a second operational mode, where in the second operational mode information is communicated between said apparatus and said another communications device over the established wireless connection, and where in the second operational mode said apparatus does not respond to any arriving messages to discover an address of said apparatus in order to establish a further wireless connection, and where the second operational mode is a non-discoverable mode.

41. The apparatus of claim 40, further comprising maintaining the second operational mode until detecting the established wireless connection is disconnected.

42. The apparatus of claim 40, wherein said apparatus is one of a Bluetooth headset, a cellular mobile station, and a Bluetooth chip.

43. The apparatus of claim 40, wherein said apparatus switches into said second operational mode in response to a pairing that is part of the wireless connection establishment process.

44. The apparatus of claim 40, wherein said apparatus returns from said second operational mode to said first operational mode in response to at least one of a reset of said another communications device, an expiry of a definite time period, and a disconnection of a short-range radio frequency connection.

45. A method, comprising:
receiving at an apparatus an inquiry message from another apparatus, an inquiry message which has been sent to determine an address of the apparatus;
generating and sending an inquiry response message including the address of the apparatus;
carrying out a connection establishment process for establishing a wireless connection between said apparatus and said another apparatus; and
based upon a successful completion of said wireless connection establishment process, switching an operational mode of said apparatus from a first operational mode to a second operational mode, where in the second operational mode information is communicated between said apparatus and said another apparatus over said established wireless connection, and where in the second operational mode the apparatus does not respond to any arriving messages to discover the address of the apparatus, where the second operational mode is a non-discoverable mode.

46. The method of claim 45, wherein said apparatus is one of a Bluetooth headset, a cellular mobile station, and a Bluetooth chip.

47. The method of claim 45, wherein the apparatus returns from the second operational mode to the first operational mode for a definite period following an event.

48. The method of claim 47, wherein the event includes a restarting of the apparatus.

49. The method of claim 45, wherein the apparatus initiates the connection establishment process.

50. The method of claim 45, wherein said apparatus switches into said second operational mode in response to a pairing that is part of the connection establishment process.

51. The method of claim 45, wherein the apparatus returns from said second operational mode to said first operational mode in response to at least one of a reset of said apparatus, an expiry of a definite time period, and a disconnection of a short-range radio frequency connection.

* * * * *